United States Patent [19]

White

[11] 4,240,015
[45] Dec. 16, 1980

[54] CONTROL SYSTEM AND METHOD FOR OPERATING A DC MOTOR

[75] Inventor: Kevin E. White, Washington Township, Warren County, N.J.

[73] Assignee: Exxon Research & Engineering Co., Florham Park, N.J.

[21] Appl. No.: 824,544

[22] Filed: Aug. 15, 1977

[51] Int. Cl.² ............................................. H02P 5/40
[52] U.S. Cl. .................................. 318/338; 318/139; 318/493
[58] Field of Search ............... 318/139, 338, 350, 356, 318/405, 406, 423, 493

[56] References Cited

U.S. PATENT DOCUMENTS

| | | | |
|---|---|---|---|
| B 475,236 | 2/1976 | Thompson | 318/139 |
| 3,475,671 | 10/1969 | Wilkerson | 318/338 |
| 3,728,599 | 4/1973 | Minami | 318/139 |
| 3,845,368 | 10/1974 | Elco | 318/139 |
| 3,909,685 | 9/1975 | Baker et al. | 318/139 |
| 3,915,251 | 10/1975 | Kassekert | 318/139 |
| 3,950,684 | 4/1976 | Peterson | 318/338 |
| 3,959,701 | 5/1976 | Bader | 318/139 |
| 3,962,612 | 6/1976 | Kawasaki | 318/139 |
| 3,984,744 | 10/1976 | Moody | 318/139 |
| 4,019,107 | 4/1977 | Dixon et al. | 318/338 |
| 4,037,144 | 7/1977 | Ohmae | 318/338 |

OTHER PUBLICATIONS

Gottlieb, I. M. *Electric Motors & Electronic Motor Control Techniques*, pp. 56–58, H. W. Sams & Co., 1976.
Kuecken, J. A. *Solid–State Motor Controls*, pp. 53–55, Tab Books, Jun. 1978.
Armstrong et al., "A Quiet Efficient Controller for Electric Vehicles" *Automotive Engineering Congress and Exposition*, Detroit, Mich., Paper No. 750470.
Thompson "Advanced Electronic Control Systems for Electric Vehicles," *Proceedings International Conference on Automotive Electronics and Electric Vehicles*, IEEE No. 76CH1146-O VT, SAE No. p. 68, Sep. 20-22, 1976.

*Primary Examiner*—David Smith, Jr.
*Attorney, Agent, or Firm*—Kenneth Watov

[57] ABSTRACT

A system applicable for use in an electric vehicle, for example, for controlling a separately-excited DC motor, permits field current control over all operating speed ranges of the motor. Below base speed a current limiting resistor is placed in series with the armature winding and the torque is directly proportional to field current. Above base speed, the resistor is shorted, and the speed is inversely proportional to field current. A feedback network is responsive to acceleration and deceleration input signals for controlling the magnitude of field current. A logic network provides automatic control, including switching battery interconnections, for changing the operating speed range of the motor by changing the level of voltage applied across the armature winding. Relatively low current switching of the batteries is provided by first summing with the error signal in the feedback loop a ramp signal, for forcing the magnitude of the armature current towards zero, second opening a switch to disconnect the batteries from the armature winding, third switching the batteries into a new circuit configuration, fourth a differential amplifier for subtracting from the new level of battery voltage the present armature voltage, produces an output signal having a level analogous to the difference therebetween for summing with the error signal for controlling the magnitude of field current to equate the battery and armature voltages, and lastly closing a switch to reconnect the battery configuration across the armature winding.

5 Claims, 8 Drawing Figures

CONTROL SYSTEM AND METHOD FOR OPERATING A DC MOTOR

The present invention is broadly related to the field of control systems for DC motors, and more specifically related to control systems for DC motors having independent field and armature windings, such as a separately-excited DC motor, for example.

Many prior art DC motor control systems provide field current control for motor speeds above base speed. For motor operation below base speed, most of these prior systems operate with the field current held to a maximum value, in conjunction with DC chopper control of the armature current for controlling the speed of a motor in this range. Once the base speed of the motor is obtained, many of these systems provide for transfer to field current control, wherein the field current is reduced towards zero for increasing motor speed or torque. At a given speed, a reduction in the magnitude of field current causes a reduction in the back EMF of the motor, resulting in an increase in the magnitude of the armature current, which typically results in an increase in the torque output of the motor. For a given voltage applied across the armature of a motor, the increased torque in turn causes an increase in speed concurrent with reduced torque, unless the field current is adjusted for maintaining the level of the torque as the speed of the motor increases. If this is not done, the motor speed will increase to a value where the torque reduces to the level of the load torque, at which point no further increase in speed can be obtained. Once the maximum speed is attained at the applied armature voltage, the speed of the motor is increased beyond this point by increasing the level of the DC voltage applied across the armature winding of the motor. The disadvantage to these prior control systems is that such systems must provide at least two subsystems, one providing for armature voltage control below base speed, the other providing for field current control above base speed. Also, many of these systems provide for battery switching from one voltage level to another, for changing the speed range of operation of the motor. In general, the switches involved in the battery switching operation must be capable of switching relatively large currents, in that the switching operation may often occur at times that the armature current has attained a relatively high value. Accordingly, the high power switches required tend to be expensive and may present reliability problems because of failure due to the deleterious effects of switching the high currents.

The present inventor recognized the problems inherent in the prior art, and solved these problems by the present invention. He discovered that if the armature current is limited in magnitude below base speed, then field current control can be used in the speed range between zero and base speed for separately-excited DC motors, and compound DC motors, for example. He also recognized that by properly controlling the magnitude of the field current, the armature current can be forced towards a zero magnitude just prior to rearranging or switching the configuration of the DC voltage supplies, for changing the speed range of the motor. In this manner, relatively inexpensive low-current switches, either solid state or electromechanical, can be employed for the switching operation, resulting in decreased cost and increased reliability. He recognized that upon completing the switching operation for reconfiguring the DC voltage supplies to change the voltage applied across the armature, if the voltage across the armature is different from the new level of voltage from the reconfigured supply, that a surge of current may flow between the armature winding and the DC voltage supply network at the time of reconnecting the latter across the armature. Accordingly, he solved this problem by including circuitry for substantially equating the voltage across the armature via control of the magnitude of the field current, with the level of voltage produced by the interconnected DC voltage supplies, just prior to reconnecting the supply network across the armature winding. Lastly, he also recognized that for given modes of operation of the DC motor, if armature current is increased above a predetermined maximum value, no further increase in the torque output of the motor can be obtained, and the extra armature current will be dissipated in the form of heat resulting in wasted power and inefficient motor operation. To avoid such inefficient operation, a current limiter is included in his system for substantially maintaining the armature current to magnitudes within the efficient operating limits of the motor.

The present inventive DC motor control system provides for selectively applying a DC voltage across the armature winding; substantially limiting the magnitude of armature current below, but not above, base speed; supplying increasing current to the field winding for increasing the speed of the motor below base speed, and decreasing current to the field winding for increasing the speed of the motor above base speed. The operating speed range of the motor is changed from a first to a second range, by sensing the magnitude of current supplied to the field winding; sensing the magnitude and direction of current supplied to the armature winding; adjusting the current supplied to the field winding to a magnitude where the armature current is substantially reduced toward zero value, in response to the magnitude of field current above base speed attaining a predetermined value concurrent with the magnitude of armature current being within a predetermined range; disconnecting the armature voltage from across the armature winding in response to the first occurring one of the field current attaining a predetermined minimum magnitude concurrent with negative armature current, the field current attaining a first predetermined maximum magnitude concurrent with positive armature current, the armature current reducing to substantially zero; changing the level of the DC output voltage to a different level; comparing the changed level of DC supply voltage with the level of the voltage across the armature winding, for producing an error voltage equal to the difference therebetween; changing the magnitude of the field current to reduce the level of the error voltage to substantially zero; and reapplying the DC supply voltage across the armature winding. Also, above base speed the magnitude of the armature current is limited to relatively useful values.

Figure 1:
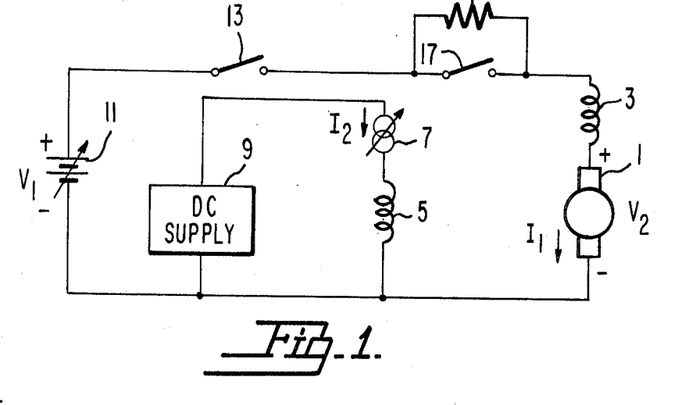
FIG. 1 is a block-circuit schematic diagram of one embodiment of the present invention.

In FIG. 1, a circuit for one embodiment of the invention includes a separately-excited DC motor having an armature winding 1, a series field and/or compensating winding 3 (not necessarily required) and a field winding 5 electrically independent from the armature winding 1. A variable current source or supply 7 powered by a DC voltage supply 9, is used to supply a given magnitude of field current $I_2$ to the field winding 5. The output voltage $V_1$, from a variable DC voltage supply 11 is applied via the conduction path including switch 13 (closed position) and either armature current limiting resistor 15 or switch 17 (closed position) to across the armature winding 1, as will be described. With the motor de-energized, the switches 13 and 17 are both open. To initiate operation of the motor in the speed range between zero and base speed $S_b$ (see FIG. 2), switch 13 is closed for applying a voltage level $V_1 = E$ from the variable supply 11 across the armature winding 1 with limiting resistor 15 in series circuit therewith. The field current supply 7 is adjusted to provide some value of field current $I_2$ to the field winding 5, for obtaining a certain magnitude of torque, $T_A$, for example, at $S = 0$, thereby initiating rotation of a motor 1,3,5 assuming that the motor torque is initially greater than the load torque imposed upon the motor 1,3,5. Assuming that the output voltage $V_1$ of the DC voltage supply 11 is maintained at a value E, with the field current held at a constant value, as the motor increases in speed, the back EMF of the motor also increases causing a reduction in the magnitude of the armature current $I_1$. As a result, the torque output of the motor reduces toward zero. At some speed $S_a$, for example, the motor torque is equal to the load torque (see FIG. 2), and the motor speed is limited to $S_a$ all other conditions remaining the same. If the field current supply 7 is adjusted for increasing the magnitude of field current, the torque output of the motor typically increases, causing an increase in the speed of the motor with proportionately decreasing torque, until the motor speed is increased to the point where the torque has again decreased to a value equal to the load torque. In this manner, the motor can be operated below base speed $S_b$ at any speed-torque point within the area of the triangle represented by $O-T_1-S_b$, with the hypotenuse ($T_1-S_b$) of the triangle representing the limit point or full field line beyond which the motor is not normally operated for the present conditions. (At full field the field winding is saturated and further increases in the magnitude of the field current do not cause a corresponding increase in the magnitude of the field flux produced by the field winding.)

Figure 2:
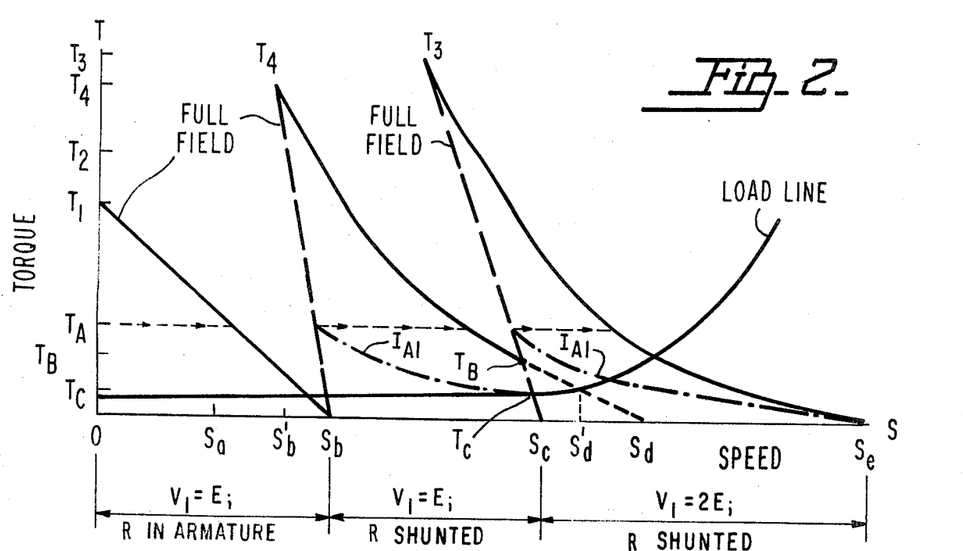
FIG. 2 is a torque-speed curve for a typical separately-excited DC motor showing three speed ranges of operation.

To operate the motor in the speed range between the speeds $S_b$ and $S_d$, switch 17 is operated to its closed position, for shunting the armature current limiting resistor 15 with the low-impedance conduction path formed by switch 17 in its closed position, in effect short-circuiting the resistor 15. Since the armature current $I_1$ is no longer limited by resistor 15, this current is substantially increased in magnitude, causing a relatively large increase in the torque output of the motor. Accordingly, the motor accelerates to a higher speed with a corresponding decrease in the torque, until a speed point is reached where the torque output of the motor is equal to the load torque as before. If, for example, switch 17 is closed at the speed $S'_b$, with the field current $I_2$ at its maximum usable or full-field magnitude, the torque output of the motor substantially increases to a value $T_2$, as shown. If all conditions are held the same, with respect to the value of voltage $V_1$ and field current $I_2$, the motor will operate along the full-field line represented by $T_4-S_b$, and will accelerate towards the speed $S_b$. In the example of FIG. 2, the load or stall line is such that the motor speed increases to a speed just below the base speed $S_b$, at which point the torque output of the motor 1,3,5 is equal to the load torque. In this speed range, to increase the speed of the motor up to and beyond $S_b$, the field current $I_2$ must be decreased in magnitude to increase the torque output of the motor. For a given speed, the maximum value of torque of this range is limited to the limit line represented by the curve $T_4-S_d$. Assuming an unloaded motor 1,3,5, the magnitude of the field current $I_2$ can be reduced to a value where the motor speed increases to the maximum speed of this range $S_d$. Of course, theoretically speaking, if the field current $I_2$ is ever allowed to be reduced to zero above base speed, the motor speed could "run away" to the destruction of the motor. With the load line as indicated, the motor speed can be increased to a maximum value of about $S'_d$, as the magnitude of the field current is reduced towards zero. In this manner, the motor can be operated above base speed $S_b$ within the area represented by $S_b-T_4-S'_d$, above the load line.

To operate the motor 1,3,5 at speeds above about $S_c$, it is necessary to increase the value of the voltage $V_1$. If the value of $V_1$ is doubled to a value 2E, for example, the motor 1,3,5 can be operated in the region represented above the load line by $S_c-T_3-S_e$. As before, the motor 1,3,5 is accelerated to higher speeds within this region by decreasing the value of the field current from full field towards some lower value for increasing the torque of the motor. Although in FIG. 2 only two speed ranges above base speed $S_b$ are shown, it should be obvious that succeedingly higher speed ranges are obtainable via increases in the value of the voltage $V_1$, within the capability of the motor. It should be noted that base speed is defined for a given armature-voltage as the full-field speed of the motor.

In the circuit of FIG. 1, it is assumed that the DC voltage supply 11 and the field current supply 7 are manually adjustable. Also, it is assumed that the switches 13 and 17 are manually operable. Of course, these supplies and switches can be operated by automatic sensing means, as shown below for other embodiments of the subject invention.

Figure 3:
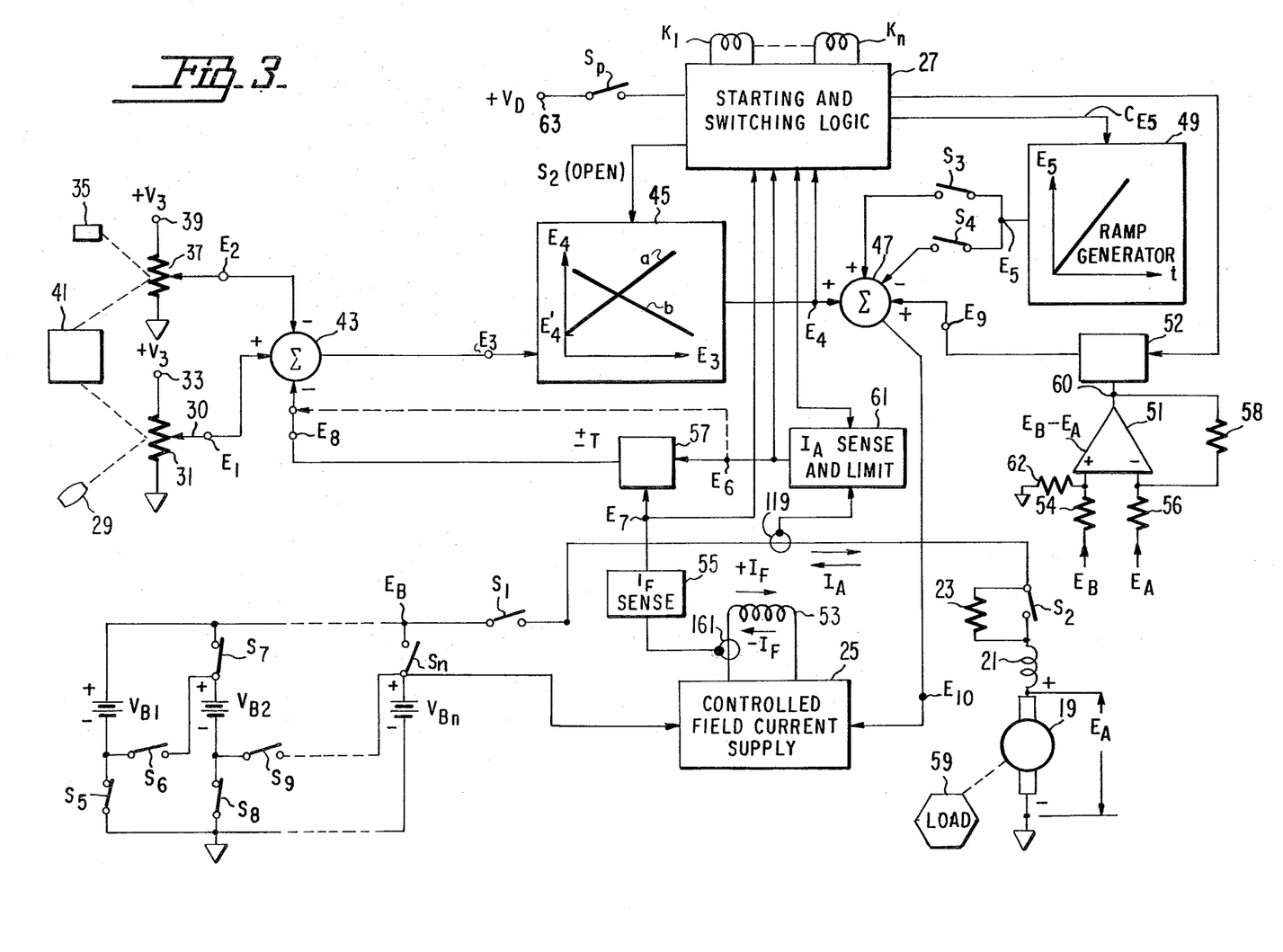
FIG. 3 is a block-circuit schematic diagram of the DC motor control system.

In FIG. 3, an automated control system for operating a DC motor 19,21,53 over a plurality of speed ranges is shown. This system is suitable for use in an electric vehicle, for example, in addition to other applications requiring a DC motor to be operated over a broad range of speeds. The switches $S_1$ and $S_2$, and current limiting resistor 23, serve the same purposes as their counterparts, switches 13, 17, and resistor 15, respectively, of FIG. 1. Also, the batteries $V_{B1}-V_{Bn}$ in a network with switches $S_5-S_n$, are analogous to the variable DC voltage supply 11. The variable current supply 7 of FIG. 1 is analogous to the controlled field current supply 25. In the operation of the control system of FIG. 3, assume initially that the system is de-energized, with switches $S_1$ through $S_4$ normally open, switches $S_5$, $S_7$, $S_8$ normally closed, and normally-opened switches $S_6$, $S_9$-$S_n$, for example. Also assume that initially voltage levels $E_1$-$E_{10}$, and $E_A$ and $E_B$ are each at zero volt. The closing of a normally-opened power switch $S_p$ to apply a voltage plus $V_D$ to the Starting and Switching Logic 27 energizes the system. If the system is applied for use in an electric vehicle, as the accelerator pedal 29 of the vehicle is depressed, the arm 30 of the potentiometer 31 is moved off ground towards the voltage $+V_3$ applied to terminal 33, in proportion to the degree of depression of the accelerator pedal 29. Accordingly, as the accelerator pedal 29 is depressed, the level of the acceleration voltage $E_1$ will rise from ground to some positive voltage between ground and the voltage level of $+V_3$. Similarly, depression of a brake pedal 35 operates another potentiometer 37 for providing a deceleration signal voltage $E_2$, the level of which corresponds to the degree of depression of the brake pedal 35. The potentiometer 37 is connected between ground and a terminal 39 for receiving the positive DC voltage $+V_3$. If the subject DC motor control system is applied for use in an automated machine, then the acceleration potentiometer 31 and deceleration potentiometer 37 might be operated by some programmable controller 41. As the acceleration voltage $E_1$ attains some positive level of DC voltage with depression of the accelerator pedal 29, this signal is summed via a summing circuit 43 with the negative value of the deceleration signal $E_2$, and the negative value of a torque signal $E_8$ to be described later. Assuming the deceleration voltage $E_2$ is at ground, that is the brake pedal is not depressed, an error voltage signal $E_3$ representing the difference between the torque signal $E_8$ and acceleration signal $E_1$ is developed and applied to a transfer function generator circuit 45. The transfer function generator 45 provides a transfer curve "a" for the motor speed operating range between zero and base speed, and a negatively sloped linear curve "b" for speeds above base speed. The magnitudes of the slopes and offset voltages for curves "a" and "b" may be equal or unequal. For electric vehicle operation, the transfer function generator 45 is designed to produce curve "a" with an offset voltage $E'_4$ for providing at least a positive level of modified error signal $E_4$ equal to the offset voltage level when the input error voltage $E_3$ is at zero volt. As the error voltage $E_3$ begins to take on a positive voltage level, this level is in effect added to the offset voltage for increasing the level of the output error signal or modified error signal $E_4$ from transfer function generator 45 in accordance with the transfer characteristics shown, or some other transfer characteristic if desired. Accordingly, even if the accelerator pedal 29 is not depressed, resulting in accelerator signal $E_1$ being at zero volt, the output error signal $E_4$ from signal generator 45 is at least at a value $E'_4$ volts.

The modified error signal $E_4$ is applied to the starting and switching logic and to a summing circuit 47. The summing circuit 47 acts to sum signal $E_4$ with the positive going ramp output signal $E_5$ from a ramp generator 49 whenever switch $S_3$ is closed (Note: other than a ramp generator can be employed for 49 so long as its output signal is positive going.), or the negative of the ramp signal $E_5$ whenever switch $S_4$ is closed, and the positive of an output signal $E_9$ from a differential amplifier 51 (whenever the normally-open switch 52 is rendered operative to its closed position via a signal $C_{52}$ from the logic network 27). For the time being, assume that the summing circuit 47 is not receiving the ramp signal $E_5$ or error signal $E_9$ (switches $S_3$, $S_4$, 52 all open), and as a result passes the transfer function output error signal $E_4$ substantially unchanged as a field current magnitude control signal $E_{10}$, for application to the controlled field current supply 25. The field current supply 25 responds to the level of the current magnitude signal $E_{10}$ to supply a given magnitude of field current to the field winding 53 of the motor 19, 21, 53. As soon as field current begins to flow through the field winding 53, an $I_F$ Sense circuit 55 responds by providing an output signal $E_7$ having a level directly proportional to the magnitude of the field current. The sensed field current signal $E_7$ is applied to the logic network 27 and to a multiplier circuit 57. As soon as the logic network 27 detects the presence of the field current signal $E_7$, the logic network 27 is programmed to respond by supplying current to the winding $K_1$ of a contactor associated with switch $S_1$, for closing the switch for applying a DC voltage $E_B$ equal in value to the voltage across the parallel circuit of the batteries $V_{B1}$ and $V_{B2}$. Assuming all of the batteries $V_{B1}$ through $V_{Bn}$ are of equal value E, a voltage equal in level to E is applied across the optional series field winding and/or commutating winding 21 and the armature winding 19 of motor 19,21,53 via resistor 23. Obviously, the batteries are connected in parallel because switches $S_5$, $S_7$ and $S_8$ are closed with switches $S_6$, $S_9$ through $S_n$ being open. The parallel connection of the batteries provides both increased current for the usual high inrush current in starting a motor rotating from zero speed, and an initially low voltage $E_B$ for the low speed range operation of the motor between zero and base speed $S_b$ (See FIG. 2). As soon as switch $S_1$ is closed, armature current $I_A$ begins to flow therefrom to and through the armature winding 21, causing a torque to be produced within the motor 19,21,53 for initiating rotation. Once the motor armature 19 begins to rotate, a back EMF or electromotive force voltage $E_A$ is developed across the armature winding 19, and increases in value as the speed S of the motor increases, causing a corresponding decrease in the value of the armature current $I_A$, as $E_A$ approaches the value of $E_B$. The following equation (1) shows the relation between $E_A$, field current $I_F$, and motor speed S:

$$E_A = K_E S I_F \qquad (1)$$

where $K_E$ is a constant. The torque of a DC motor or machine is given in Equation 2 below:

$$T = K_T E_A I_A / S \qquad (2)$$

where $K_T$ is a constant.

$$E_B = I_A R_T + K_E S I_F \qquad (3)$$

where $E_B$ is the DC voltage applied across the armature circuit of the motor, and $R_T$ is the total series resistance of the armature circuit and voltage source for $E_B$. The combination of equations (1), (2), and (3) fully characterize the motor torque versus speed interrelationship for any value of field current. Equations (1), (2) and (3) are true only if it is assumed there are no losses in the motor. Accordingly, as the speed of the motor 19,21,53 increases, the torque output of the motor 19,21,53 decreases (See FIG. 2). If the motor 19,21,53 is unloaded and the magnitude of the field current is at maximum value, then for any given value of torque generated, the motor 19,21,53 will accelerate up to a speed equal to the base speed.

As soon as armature current $I_A$ begins to flow, an $I_A$ Sense and Limit circuit 61 provides an output signal $E_6$ having an amplitude and polarity indicative of the magnitude and direction of flow of the armature current $I_A$. This armature current signal $E_6$ is applied to the multiplier circuit 57 and to the starting and switching logic network 27. The multiplier circuit 57 responds by producing as an output signal $E_8$, the product of the field current and armature current voltage signals $E_7$ and $E_6$. The signal $E_8$ has a voltage level analogous to the torque of the motor 19,21,53, a positive polarity when the motor is in its motoring condition, and a negative polarity when the motor 19,21,53 is acting as a generator, as will be explained. The torque signal $E_8$ is in effect a feedback signal within a closed-loop feedback system, and is applied to an inverting or negative input terminal of the summer circuit 43, for subtraction from the accelerator signal $E_1$, as previously explained. Accordingly, because of the offset voltage $E'_4$ provided in the transfer function generator 45, a minimum starting torque $T_c$, for example, is developed, and the motor 19,21,53 may accelerate up to some low speed for the electric vehicle, where motor torque equals the load torque. With $E_1$ at zero volt, the error voltage $E_3$ is negative, causing the value of the modified error voltage $E_4$ to be equal to the value of the offset voltage $E'_4$ for this condition (generator 45 is not responsive to negative values of $E_3$), thereby providing no true regulation of the motor 19,21,53 which will rotate at a low speed as previously described, or be in a stall condition where the vehicle is not moving.

The multiplier circuit 57, as described, serves to provide a torque signal $E_8$. This torque signal $E_8$ can of course be obtained from any one of other known torque sensing transducers. The transducer used in this system is partly dependent upon the range of torque values to be measured and the required accuracy of measurement for the particular application. As example of another torque sensing means is a strain gauge torque sensor, which measures the torque of a rotating member directly through mechanical coupling.

As the accelerator pedal 29 is depressed, the level of the accelerator signal $E_1$ becomes increasingly positive, eventually causing the error voltage $E_3$ to take on a positive level of voltage, in turn causing the transfer signal generator 45 to increase the level of the modified error signal $E_4$. Obviously, as the modified error signal $E_4$ begins to increase in a positive direction, the level of the field current magnitude control signal $E_{10}$ will correspondingly increase, causing an increase in the magnitude of the field current $I_F$ supplied to the field winding 53. The torque output of the motor 19,21,53 correspondingly increases causing the motor to accelerate to some higher level of speed until the torque of the motor 19,21,53 decreases to a value equal to the load torque 59. Assuming that torque feedback, as described, is employed in the system for the electric vehicle, a given degree of depression of accelerator pedal 29 causing a given setting of the potentiometer 31 causes the acceleration signal $E_1$ to in actuality be a motor torque control signal. That is, each setting of the potentiometer 31 provides a level of voltage for signal $E_1$ analogous to some level of torque or a torque line such as at $T_A$ in FIG. 2. In this manner a family of torque lines greater in value and lesser in value than $T_A$ can be obtained for different settings of the potentiometer 31. Assuming that the accelerator pedal 29 is depressed to set potentiometer 31 for a level of signal $E_1$ corresponding to torque line $T_A$, the feedback system previously described produces appropriate values of error voltage $E_3$ and modified error voltage $E_4$ for substantially maintaining the torque output of the motor equal to $T_A$.

In the preferred embodiment of the invention, torque feedback as described above provides for a more constant acceleration than is obtained from armature current feedback, for example, as will be shown. Armature current feedback is obtained by directly applying the sensed armature current signal $E_6$ to the summation circuit 43 in place of the torque signal $E_8$. In FIG. 3, such a feedback connection is shown by the broken line from the $E_6$ signal point to the inverting input terminal of the summer circuit 43. When armature current feedback is employed, the acceleration signal $E_1$ is actually representative of some level of armature current, $I_{A1}$, for example, above base speed. In FIG. 3, for armature current feedback, curve "a" of transfer function generator 45 can be used below base speed, but it is preferred that below base speed $E_6$ be disconnected from summer 43, due to undesirable effects caused by armature current feedback below base speed. If $E_6$ is so disconnected, then only field current control is employed below base speed via $E_1$ and $E_2$. Above base speed, curve "b" can be used. Obviously, with armature current feedback, even though the armature current is being held substantially at a constant value for a given setting of the potentiometer 31, the acceleration of the motor rapidly decreases due to the decreasing value of torque with increasing speed, as shown in FIG. 2, for a constant magnitude of armature current $I_{A1}$ above base speed $S_b$. In a preferred embodiment, incorporating torque feedback, as previously described, the torque output is held relatively constant, thereby maintaining a relatively constant acceleration for the motor 19,21,53. Of course, if the motor 19,21,53 is driving an electric vehicle, for example, so long as the load upon the vehicle remains relatively constant, with torque feedback the acceleration of the vehicle or motor will remain relatively constant, but if the magnitude of the load increases or decreases, the acceleration which is directly proportional to the difference between motor and load torques, decreases or increases respectively. Before describing the operation of the DC motor control system of FIG. 3 in greater detail, it is necessary to describe the circuitry associated with certain of the elements of the system. Assume that all of the switches shown, other than the power switch $S_P$, that is, switches $S_1$ through $S_n$, and switch 52, are all solid state switches or electromechanical contactors having electrical windings $K_1$-$K_n$, respectively, operated by control signals from the starting and switching logic 27. In some cases it is preferred that solid-state switches be used, but for purposes of explanation, $K_1$-$K_n$ are shown as relays or contactors in this example.

Figure 4:
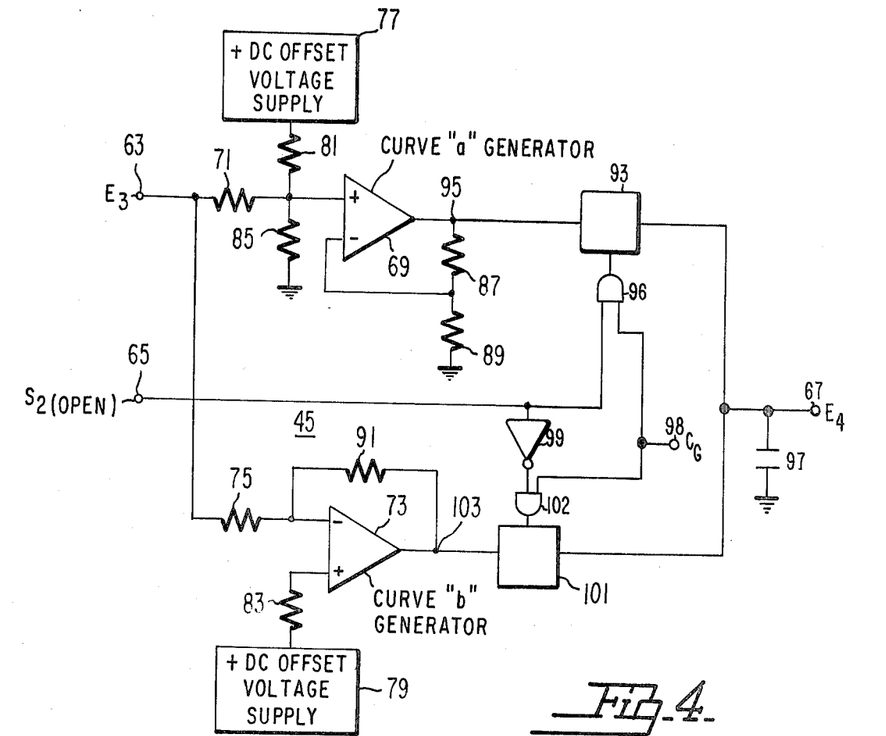
FIG. 4 is a circuit schematic diagram of a transfer function generator providing curves a and b for conditioning input signal $E_3$ to provide output signal $E_4$.

In FIG. 4, the transfer function generator 45 includes an input terminal 63 for receiving the error voltage $E_3$, a control terminal 65 for receiving a high-level control signal $S_{2(OPEN)}$ from the starting and switching logic 27 whenever switch $S_2$ is open, and a ground level signal from the logic 27 whenever the switch $S_2$ is closed. The positive-going ramp signal "a" or negative-going ramp signal "b" are developed at an output terminal 67, and represent the modified error signal $E_4$. AND gates 96 and 102 are enabled by a gating signal $C_G$ applied to an input terminal 98, as described below. The error signal $E_3$ is applied to the noninverting terminal of a differential amplifier 69 via an input resistor 71, and to the inverting terminal of another differential amplifier 73 via an input resistor 75. Positive DC offset voltage supplies 77 and 79 have their output voltages applied individually via input resistor 81 to the noninverting terminal of amplifier 69, and via input resistor 83 to the noninverting terminal of amplifier 73, respectively. A pull-down or grounding resistor 85 is connected between the noninverting terminal of amplifier 69 and ground. The gain of amplifier 69 is controlled by the relative values of the feedback resistor 87, grounding resistors 85, 89, and input resistors 71,81. The gain of amplifier 73 is controlled by the values of the feedback resistor 91 and input resistors 75,83.

At zero motor speed, switch $S_2$ is open, as previously explained, $C_G$ is high, and the control signal $S_{2(OPEN)}$ is high, and is applied to a solid-state switch 93, via AND gate 96, for closing the conduction path between the output terminal 95 of amplifier 69 and the sample and hold capacitor 97. Assume at this time the error signal $E_3$ is at zero volt, and the DC offset voltage from supply 77 is summed through amplifier 69 with some gain, conducted via switch 93 to charge capacitor 97 to the level $E'_4$ of the modified error signal $E_4$ (see FIG. 3). It should be noted that below base speed the inverter 99 acts to invert the positive level $S_{2(OPEN)}$ signal to apply a ground signal to a solid-state switch 101 via AND gate 102, for maintaining the switch in a nonconductive state, i.e. keeping open the conduction path from the output terminal 103 of amplifier 73 and the integrating capacitor 97. As the level of the error voltage $E_3$ begins to increase towards a predetermined peak value, for increasing the speed or torque output of the motor 19,21,53, this error signal is added to the offset voltage from supply 77 with gain via amplifier 69, and the now positively increasing output signal from amplifier 69 is conducted via switch 93 to the capacitor 97. The corresponding signal developed across the capacitor 97 is applied to output terminal 67 as the modified error signal $E_4$. In this manner, the transfer function corresponding to curve "a" is produced. When the armature current $I_A$ is less than a predetermined maximum positive value, at which time the speed of the motor 19,21,53 usually is at about base speed $S_b$, the switching logic 27 responds by generating a control signal to close the switch $S_2$ (energizing a contactor coil $K_2$ in this example), and at the same time changes the level of the $S_{2(OPEN)}$ control signal to ground. The system is now configured to operate the motor at speeds above base speed. The switch 93 in response to the output signal from AND gate 96 going low (due to the $S_{2(OPEN)}$ control signal level changing to ground level), becomes nonconductive, thereby opening the conduction path between the output terminal 95 of amplifier 69 and capacitor 97. At substantially the same instant in time, inverter 93 responds to the output signal from AND gate 102 going high (due to the change in the level of the $S_{2(OPEN)}$ control signal) by applying a positive signal to the switch 101. The switch 101 responds by becoming conductive or conducting the output signal from amplifier 73 to the integrating capacitor 97. The amplifier 73 operates to subtract the error signal $E_3$ from the DC offset voltage produced by voltage supply 79, for producing the transfer function corresponding to curve "b". In effect, above base speed, as the level of the error voltage $E_3$ increases, the level of the output signal from amplifier 73 becomes correspondingly less positive, causing capacitor 97 to discharge to this less positive level.

Figure 5:
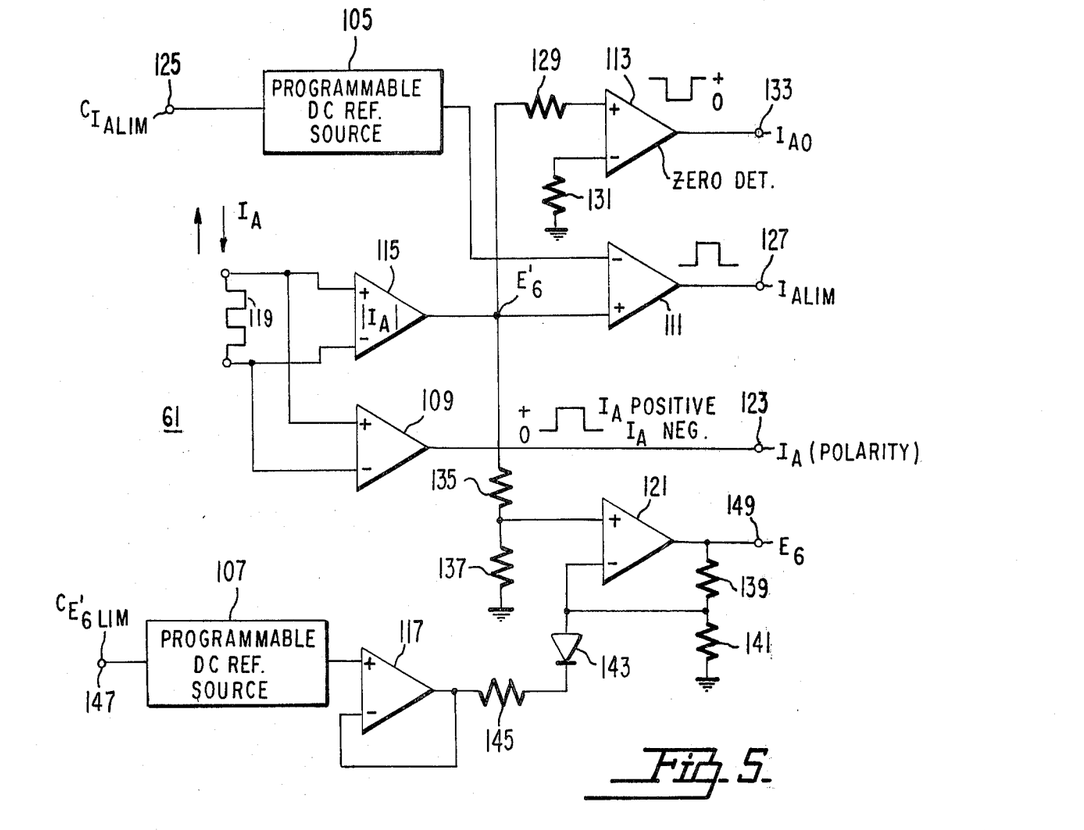
FIG. 5 is a circuit schematic diagram of the $I_A$ sense and limit circuit.

In FIG. 5, the $I_A$ Sense and Limit circuit 61 includes two programmable DC reference sources 105 and 107, two voltage comparators 109 and 111, a zero value detector or comparator 113, an absolute value detector 115, a follower amplifier 117, a current shunt 119, and a differential amplifier 121. The current shunt 119 is placed in series circuit with the armature winding 19 of the motor 19,21,53. Whenever armature current $I_A$ is flowing through the armature winding 19, a voltage drop is produced across the shunt 119 that has a level proportional to the magnitude of the armature current $I_A$. The polarity of this voltage will change whenever the direction of the armature $I_A$ is reversed. This shunt voltage is applied to both the absolute value detector 115 and the comparator 109. The output signal $E'_6$ from the absolute value detector corresponds to the absolute value of the armature current $I_A$ at any given time. The comparator 109 responds to the voltage across shunt 119, for producing at an output terminal 123 an $I_{A(POLARITY)}$ signal which has a positive level when the armature current $I_A$ is flowing from the battery network $V_{B1}-V_{Bn}$ into the armature winding 19, and a ground or zero volt level when the armature current $I_A$ is flowing from the armature winding 19 into the battery network $V_{B1}-V_{Bn}$ (motor 19,21,53 acting as a generator). The switching logic network 27 is programmed to provide a control signal $C_{IALIM}$ to an input terminal 125 for determining the level of the output voltage from the DC reference source 105. Whenever the absolute value of the armature current $I_A$ represented by the level of output signal $E'_6$ exceeds the level of the reference voltage from the programmable DC reference source 105, the comparator 111 responds by producing a positive-going output signal $I_{ALIM}$ at an output terminal 127. Also, the output signal $E'_6$ is applied via an input resistor 129 to the noninverting terminal of the comparator 113, the inverting terminal of which is returned to ground via an input resistor 131. Accordingly, whenever the level of the output signal $E'_6$ is at zero volt or ground, the comparator 113 responds by changing the level of its output signal $I_{AO}$ from a positive level to zero volt or ground at an output terminal 133.

Figure 6:
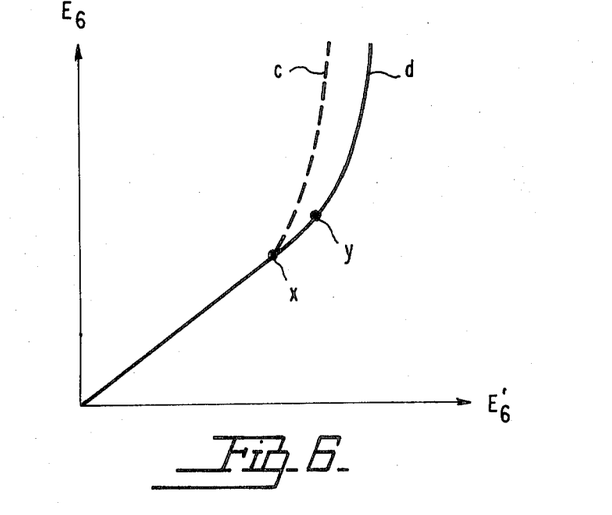
FIG. 6 is a curve illustrating the relationship of the signal $E'_6$ to the signal $E_6$, in the operation of the limiting portion of the circuit of FIG. 5.
Figure 8:
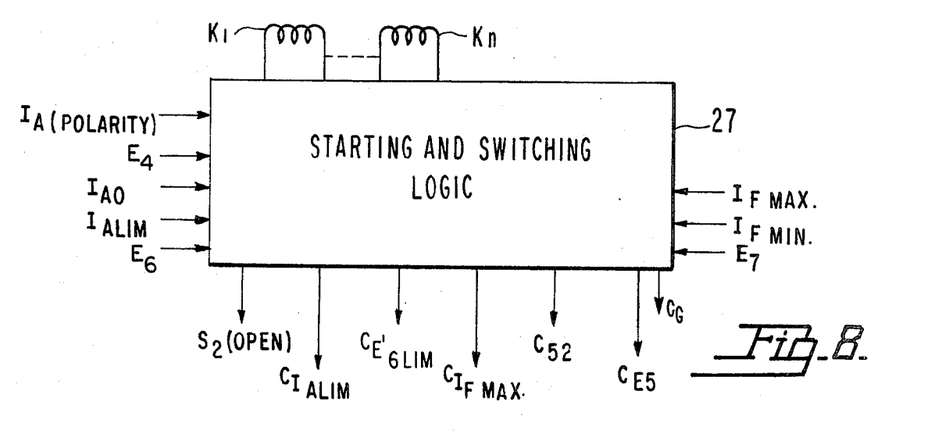
FIG. 8 is a block diagram showing signals associated with the starting and switching logic 27.

The absolute value signal $E'_6$ is also applied via an input resistor 135 to the common connection of the noninverting terminal of the differential amplifier 121 and grounding resistor 137. The relative values of feedback resistor 139, grounding resistors 141 and 137 and input resistor 135 determine the gain of the differential amplifier 121. A diode 143 is connected with its anode to the inverting terminal of amplifier 121 and its cathode connected via resistor 145 to the output terminal of amplifier 117. The switching logic is programmed to produce a control signal $C_{E'6LIM}$, which signal is applied to input terminal 147 for programming the output voltage level of the programmable DC reference source 107. Since amplifier 117 is connected as a voltage follower, the diode 143 is backbiased whenever the level of the voltage applied to its anode electrode from the voltage divider 139,141 (dividing armature down current signal $E_6$) is lower than the level of the output voltage from the DC reference source 107 applied to its cathode electrode via 117,145. Whenever the level of the armature current absolute value signal $E'_6$ exceeds a predetermined level above which the motor will operate inefficiently at the corresponding armature current magnitudes, the armature current signal $E_6$ attains a relative level exceeding the programmed level of the output voltage from the DC reference source 107, causing the diode 143 to become forward biased or conductive. When this occurs, the series circuit of diode 143, resistor 145, voltage follower 117, and reference source 107, is connected in parallel with resistor 141. This parallel combination has a resistance that is substantially lower than the value of resistor 141 alone because the value of resistor 145 is chosen to be about 1/10 that of resistor 141, for example. Accordingly, the gain of amplifier 121 is increased by a factor of about 10 causing the amplitude of the armature current signal $E_6$ at output terminal 149 to substantially increase. In FIG. 6 the transfer function curve for the amplifier 121 is shown and in this example, for values of armature current $I_A$ below the limiting level, the amplitudes of the absolute value armature current signal $E'_6$ and armature current signal $E_6$ are about equal. Above the limit point, designated as X on the curve, the gain of amplifier 121 is changed from about unitary gain to a gain of about 10 causing the greatly increased slope of the curve as indicated by the broken line c (for one level of output voltage from the DC reference source 107). If the level of the output voltage from the DC reference source 107 is programmed to be at a higher level via the signal $C_{E'_6-LIM}$, the gain of the amplifier 121 is not modified until the point Y is reached on the curve as shown by "d". In other words, the logic can be programmed to in turn program the reference source 107 for causing the gain of the amplifier 121 to change at any given magnitude of armature current $I_A$. As previously described above, the armature current signal $E_6$ is applied to the multiplier 57 for torque feedback, or directly to the summer 43 for armature current feedback. Regardless of the type of feedback used, when the gain of amplifier 121 is so increased, the substantially increased value of signal $E_6$ results in a substantial decrease in the value of the error voltage $E_3$, causing the above-described feedback system to effectively control the magnitude of the field current, for limiting the value of the armature current $I_A$ to magnitudes within the range of efficient operation of the motor 19,21, 53, when operating with switch $S_2$ closed. The output signals from the armature current Sense and Limit circuit 61 are each applied to the starting and switching logic network 27, as shown in FIG. 8.

Figure 7:
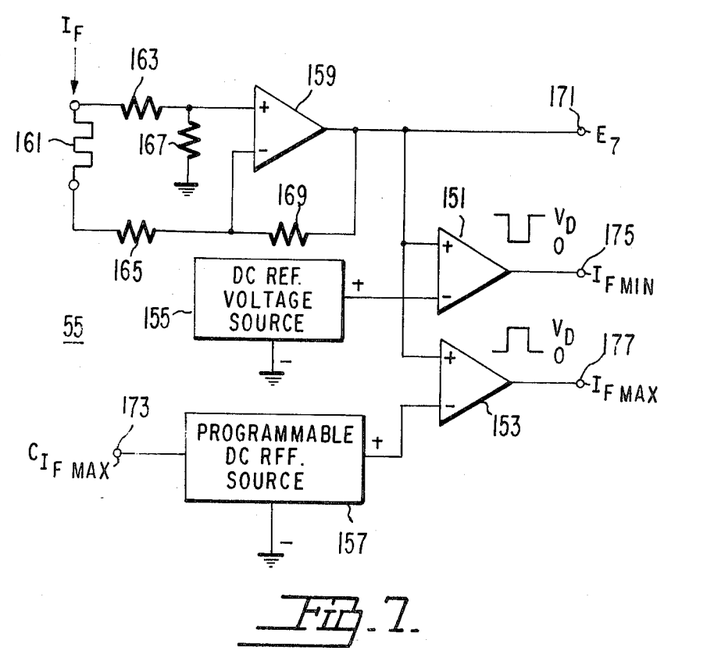
FIG. 7 is a circuit schematic diagram of the $I_F$ sense circuit.

In FIG. 7, the $I_F$ Sense circuit 55 includes two voltage comparators 151,153, a DC reference voltage source 155, a programmable reference source 157, a differential amplifier 159, and a current shunt 161. The current shunt 161 is connected in a series circuit with the field winding 53 of the motor 19,21,53. When field current $I_F$ is flowing through the field winding 53, a voltage drop is developed across the current shunt 161. The level of the voltage drop across the shunt 161 is directly proportional to the magnitude of the field current, and the polarity of this voltage is indicative of the direction of flow of the field current $I_F$. This voltage is applied via input resistors 163,165 to the noninverting and inverting terminals of amplifier 159, respectively. A pull-down resistor 167 is connected between the noninverting terminal of amplifier 159 and ground. The gain of amplifier 159 is determined by the values of the feedback resistor 169 and the resistors 163,165 and 167. The output signal from amplifier 159 is applied to output terminal 171 as signal voltage $E_7$, directly proportional in amplitude to the magnitude of the field current $I_F$. The field current signal $E_7$ is also applied to the noninverting terminals of the comparators 151 and 153. The positive output voltage from a DC reference voltage source 155 is applied to the inverting terminal of comparator 151, the output voltage from a programmable reference source 157 is applied to the inverting terminal of comparator 153. The starting and switching logic network 27 is programmed to provide a control signal $C_{IFMAX}$ to an input terminal 173, for in turn programming the DC reference source 157 for providing a given level of output voltage to comparator 153. When the amplitude of the field current signal $E_7$ reduces to below the value of the output voltage from the voltage source 155, the comparator 151 responds by changing the level of its output signal from $V_D$ to zero volt or ground. This output signal is applied to an output terminal 175 for providing an $I_{FMIN}$ signal indicative of the field current $I_F$ reducing to or below some predetermined minimum value. Whenever the field current signal $E_7$ exceeds the value of the output voltage from the DC reference source 157, the comparator 153 responds by changing the level of its output signal from ground or zero volt to $+V_D$. An output terminal 177 receives this signal for providing an $I_{FMAX}$ signal indicative of the field current $I_F$ exceeding some predetermined magnitude. The three output signals $E_7$, $I_{FMIN}$, $I_{FMAX}$, are each applied to the starting and switching logic network 27.

With reference to the prior discussion for the operation of the circuit of FIG. 3, and with reference to the operation of the circuits of FIGS. 4, 5, 7, and 8, a more detailed explanation of the operation of this system follows. In the speed range of operation of the motor below base speed, as the accelerator pedal 29 is increasingly depressed for obtaining an increased speed or motor torque, the field current $I_F$ approaches a first predetermined maximum value $I_{FMAX}$, as determined by the $C_{IFMAX}$ signal from logic 27. If this first maximum value of field current $I_{FMAX}$ is attained, the $I_{FMAX}$ signal from the $I_F$ Sense circuit 55 will go high. At zero speed the magnitude of armature current $I_A$ is such that the $I_{ALIM}$ signal is high. As the vehicle accelerates toward base speed a decrease in armature current $I_A$ occurs as described previously. At some speed close to base speed, the magnitude of the armature current changes to a value where $I_{ALIM}$ goes low. In response to the change in level of the $I_{ALIM}$ signal from some positive level $+V_D$, to ground the logic network 27 will operate to apply power to the winding $K_2$ of the contactor associated with the switch $S_2$, causing switch $S_2$ to close for shunting the limiting resistor 23, as previously described. At substantially the time of closure of switch $S_2$, the logic network is programmed to change the level of the $S_{2(OPEN)}$ signal from a high level to a low level (to ground), for operating the transfer function generator 45 to modify the error signal $E_3$ in accordance with the curve "b" as previously described. If the accelerator pedal 29 is increasingly depressed for even greater speed and torque above base speed, the magnitude of the field current reduces towards some minimum value $I_{FMIN}$. If the magnitude of the field current attains this value, $I_{FMIN}$, the $I_F$ Sense circuit 55 responds by changing the level of the $I_{FMIN}$ signal from a high level to a low level, as previously explained. If the low level of the $I_{FMIN}$ signal is concurrent with either one of two conditions, the first being a low level of $I_{ALIM}$ signal concurrent with a high level of $I_{A(-}$ POLARITY) signal, the second being a low level of $I_{A(POLARITY)}$, the logic network 27 is programmed to initially change the level of the $C_G$ signal from a high to a low level, and then to apply a ramp initiation signal $C_{E5}$ to the ramp generator 49. This causes the ramp generator 49 to turn on for initiating the production of a ramp signal starting from zero volt. In response to $C_G$ going low, AND gates 96 and 102 of transfer function generator 45 are disabled, each producing a low level output signal for turning off the energized one of switches 93 and 101 (see FIG. 4), and maintaining these switches 93,101 turned off. In this manner, the main feedback loop is disabled to prevent its operating while other circuit means are controlling the magnitude of the field current. At this time, the charge established in capacitor 97 acts to hold $E_4$ at its last previous value, and acts to reduce transient effects when $C_G$ again goes high, permitting one of switches 93 and 101 to turn on. At substantially the same time, if the $I_{A(POLARITY)}$ signal is high, indicating that the motor 19, 21, 53 is in a motoring mode of operation (armature current flowing from the batteries into the armature winding 21), the logic network 27 responds by applying current to the coil of contactor $K_3$, for closing the associated switch contact $S_3$. Also, at the time of initiating signal $C_{E5}$, the logic network 27 is programmed to modify the $C_{IFMAX}$ signal, for causing the $I_F$ Sense circuit 55 to produce the $I_{FMAX}$ output signal at a second predetermined maximum value of field current. When switch $S_3$ is closed, the positive-going ramp signal from the ramp generator 49 is added to the modified error signal $E_4$ for increasing the value of the field current control signal $E_{10}$ in a linear manner, forcing armature voltage $E_A$ to increase, which forces the magnitude of the armature current $I_A$ towards zero value. Upon sensing the first occurring one of the $I_{FMAX}$ signal going high, or the $I_{A0}$ signal going low (indicating zero magnitude for armature current $I_A$), the logic network 27 responds by removing current from the winding of the contactor $K_1$, causing the switch contacts $S_1$ to open, for removing the DC voltage $E_B$ from the motor 19,21, 53. The switching logic network 27 is programmed to next apply current to the windings of contactors $K_5$, $K_6$, and $K_7$, for opening the switch contacts $S_5$ and $S_7$, and for closing the switch contact $S_6$. Accordingly, the batteries $V_{B1}$ and $V_{B2}$ are now connected in series instead of in parallel as before, for example. Of course, the logic can be programmed for causing some other operation of the switches $S_5$ through $S_n$, to obtain some other configuration of the batteries $V_{B1}$-$V_{Bn}$. Accordingly, the level of voltage $E_B$ has been doubled to a value 2E, as previously described, in this example. Obviously, by forcing the magnitude of the armature current $I_A$ to about zero value before opening switch $S_1$, avoids the switch $S_1$ from having to interrupt a relatively high magnitude of current flowing through its contacts. Accordingly, arcing across the contacts of $S_1$ is avoided or substantially minimized permitting a less expensive switch to be reliably used as $S_1$.

For the same reason, it is desirable prior to again closing the contacts of switch $S_1$, to in some way equate the new value of the voltage at $E_B$ with the present value of the voltage $E_A$ across the armature winding 19 of the motor 19,21,53. This is accomplished by programming the logic network 27 to apply a control signal $C_{52}$ to the solid stage switch 52 ($C_G$ is still low), for operating the switch 52 to provide a conduction path from the output terminal 60 of amplifier 51 to the summing circuit 47. The level of voltage at terminal 60 is directly proportional to voltage $E_B$ minus voltage $E_A$, applied via input resistors 54 and 56. The gain of amplifier 51 is determined by the value of feedback resistor 58, input resistors 54 and 56, and grounding resistor 62. If the level of the voltages $E_B$ and $E_A$ are unequal, the output error signal $E_9$ from amplifier 51 is of appropriate amplitude and polarity for changing the amplitude of the field current control signal $E_{10}$ in a direction for changing the level of the voltage $E_A$ across the armature winding 19 to a value substantially equal to the level of $E_B$. An appropriate delay is programmed into the logic network 27 to permit the equating of the voltages $E_B$ and $E_A$ to occur, as described, after which time the logic network 27 again supplies current to the winding of the contactor $K_1$ for closing the switch contacts $S_1$ concurrent with raising high the level of signal $C_G$. With reference to FIG. 4, when $C_G$ again goes high, AND gates 96 and 102 are enabled, permitting switch 101 to be turned on (assume $S_2$(OPEN) is low), for producing curve "b" at terminal 67. Also at this time $C_{52}$ goes low and $C_{IFMAX}$ is modified for obtaining $I_{FMAX}$ for the first predetermined maximum value of field current. With reference to FIG. 2, the motor 19,21,53 is now operating in the speed range between the speeds $S_c$ and $S_e$. It should be noted that if prior to opening the switch contacts $S_1$, the motor 19,21,53 happened to be in a generating mode of operation (such as may occur if a vehicle is traveling downhill hill or braking, for example), then the switching logic in response to the armature current polarity signal $I_{A(POLARITY)}$ being low or at zero volt, applies current to the winding of contactor $K_4$, instead of $K_3$, for closing switch $S_4$ instead of $S_3$.

Accordingly, the output signal $E_5$ from the ramp generator 49 will now be subtracted from the modified error signal $E_4$ instead of added thereto as in the previous case, for decreasing the magnitude of the field current $I_F$ toward zero, for forcing the magnitude of the armature current $I_A$ towards zero. In this instance, the logic network 27 will respond to the first occurring one of the $I_{FMIN}$ signal going low or to ground, or the $I_{A0}$ signal going low or to ground, for removing current from the winding of the contactor $K_1$, for opening the switch contacts $S_1$. The batteries $V_{B1}$ and $V_{B2}$ are then reconfigured, next the voltages $E_B$ and $E_A$ are equated, $C_G$ is raised to a high level, and lastly the switch contacts $S_1$ are again closed, as previously explained.

Switching down from a higher speed range into lower speed ranges is accomplished in a manner similar to that just described for switching up into higher speed ranges above base speed $S_b$. Above base $S_b$, when the $I_{FMAX}$ signal line goes high, indicating that the field current has attained the first predetermined maximum value, the switching logic network 27 is programmed to go into a switching down mode provided that the magnitude of the armature current $I_A$ is greater than a negative-limiting value, in this example (the latter being indicated by either [1] $I_{ALIM}$ signal line being low concurrent with the $I_{A(POLARITY)}$ signal line being low, or [2] $I_{A(POLARITY)}$ line being high). If the above conditions are satisfied, and the armature current $I_A$ has a negative polarity, that is the motor 19,21,53 is acting as a generator (regenerative braking mode of operation), the starting and switching logic 27 in response to the $I_{A(POLARITY)}$ signal line being accordingly low, first changes the level of $C_G$ to a low level, modifies $C_{IFMAX}$ for sensing the second predetermined value of field current, and then supplies energy to the winding associated with the contactor $K_4$ for closing the switch contacts $S_4$, concurrent with raising the $C_{E5}$ line high for initiating operation of ramp generator 49, for reducing the value of the field current control signal toward zero to force the value of the magnitude of the armature current $I_A$ toward zero, as previously described. Alternatively, if the $I_{A(POLARITY)}$ signal line is high, the starting and switching logic 27 responds by producing $C_G$, $C_{IFMAX}$ and $C_{E5}$ as just described, but instead then energizes the winding associated with the contactor $K_3$ for closing the switch contacts $S_3$, for increasing the value of the field current control signal $E_{10}$ to increase the magnitude of the field current $I_F$, for forcing the magnitude of the armature current $I_A$ toward zero. Thereafter, if the motor 19,21,53 is initially in a regenerative braking mode of operation, i.e. acting as a generator with $I_A$ having a negative polarity, the logic network 27 is responsive to the first occurring one of the $I_{FMIN}$ signal line going low or the $I_{AO}$ signal line going low (indicating zero magnitude of armature current $I_A$), for de-energizing or removing the current from the winding associated with contactor $K_1$ for opening the switch contacts $S_1$. Alternatively, if the motor 19,21,53 is in a motoring mode of operation, indicated by a positive magnitude of armature current, $I_A$ [$I_{A(POLARITY)}$ signal line being high], the starting and switching logic network 27 is responsive to the first occurring one of the $I_{FMAX}$ signal going high for the second predetermined maximum value of field current $I_F$, or the $I_{AO}$ signal line going low, for de-energizing the winding associated with contactor $K_1$ for opening the switch contacts $S_1$.

At substantially the same time that $S_1$ is opened, the logic network 27 responds changing the $C_{E5}$ signal line low for turning off the ramp generator 49, redefines $C_{IFMAX}$ for the first predetermined value of $I_{FMAX}$, $C_G$ to high, $C_{52}$ to low, and de-energizes the previously-energized one of the windings associated with the contacts $K_3$ or $K_4$, for opening the previously-closed one of the switches $S_3$ or $S_4$, for removing the ramp signal from the summing circuit 47. Also, just after de-energizing the winding for contactor $K_1$, the logic network 27 is programmed to energize and de-energize the appropriate ones of the windings associated with contactors $K_5$ through $K_n$, for reconfiguring the battery network for producing a lower value voltage $E_B$. In this example, the windings associated with contactors $K_5$ through $K_n$ are de-energized for placing the batteries in parallel between the $E_B$ voltage point and ground, as previously described. Thereafter, the armature voltage $E_A$ is equated with the new battery voltage, ($E_B=E$ in this example), prior to raising $C_G$ high, and re-energizing the winding associated with contactor $K_1$ for closing switch contacts $S_1$, as previously described.

It should be noted that in this example, in switching down from higher speed ranges above base speed $S_b$, the winding associated with contactor $K_2$ is maintained in an energized state for maintaining $S_2$ in a closed condition. In other words, the armature current limiting resistor 23 is only employed during the starting mode of operation of the system, in this example. Of course, it is possible that in certain applications it may be desirable to program the starting and switching logic network 27, for switching back down from above base speed $S_b$ to below base speed $S_b$, in which case the winding associated with contactor $K_2$ would be de-energized for opening the switch contacts $S_2$.

To stop the vehicle or motor 19,21,53, the motor 19,21,53 is first decelerated to the lowest speed range above base speed, as previously described, if not already in that range. Next, contacts $S_1$ are opened if the accelerator pedal 29 is fully released concurrent with the $I_{FMAX}$ signal being high.

It should also be noted that the function of ramp generator 49, and switches $S_3$ and $S_4$ can be served by other means. For example, for forcing $I_A$ to zero, a differential amplifier comparing $I_A$ with zero, producing an error signal for application to summer 47, for modifying the value of field current accordingly. Also, motor reversal can be accomplished by switching the direction of field current $I_F$.

In summation, above base speed, the switching logic network 27 is programmed for switching up to higher speed ranges whenever the magnitude of the field current $I_F$ attains some predetermined minimum value concurrent with the armature current $I_A$ being below some predetermined positive maximum magnitude. Also, the switching logic network 27 is programmed to automatically switch down to a lower speed range if the magnitude of the field current $I_F$ attains a predetermined maximum value, provided that the armature current $I_A$ has a magnitude greater than a predetermined negative value.

If the accelerator pedal 29 is partially depressed at zero motor speed, for example, the preferred embodiment of the system automatically operates to maintain a substantially constant torque output from the motor 19,21,53, while switching the system for successively higher speed ranges of operation of the motor 19,21,53, as previously described, until the maximum motor speed is attained. Similarly, if while at a very high speed of operation the accelerator pedal 29 is suddenly released and the motor 19,21,53 allowed to slow down, the system is programmed to automatically switch down to lower speed ranges of operation. If at the time of releasing accelerator pedal 29, the brake pedal 35 is then fully or partially depressed, causing the deceleration signal $E_2$ to have a positive amplitude somewhere between ground and $+V_3$, the error voltage $E_3$ will be more rapidly reduced toward zero volt than if the accelerator pedal 29 was merely released without depressing the brake pedal 35, causing the system to more rapidly switch down to lower speed ranges of operation. In this deceleration mode of operation, the motor 19,21,53 may be operating in a regenerative mode, that is, acting as a generator. Note that in the regenerative mode, with respect to FIG. 2, the torque-speed curves extend below the zero torque axis, for the resultant negative torque operation (not shown). For purposes of energy conservation, when the motor 19,21,53 is so acting as a generator, the armature current $I_A$ is supplied to the batteries for recharging them.

The starting and switching logic network 27 may include a microprocessor, or a minicomputer, for example. Depending upon the application, the logic network 27 may also include a fixed memory storage, whereby it cannot be reprogrammed, or some type of random access memory, whereby it can be reprogrammed for providing alternative modes of system operation. The logic network 27 may also include a network of hardwired logic for accomplishing the control functions in a system not requiring the flexibility offered by a programmable network. It should be noted that the controlled field current supply 25 can be a pulse width modulated supply, for example, or any other current supply capable of responding to the amplitude of a control signal for supplying a desired magnitude of field current to the field current winding 53.

What is claimed is:

1. A system for operating a DC motor having at least one independent field winding and an armature winding, over a plurality of speed ranges, comprising:

a plurality of DC voltage supply means;

switching means repsonsive to different ones of a plurality of switching control signals, for selectively connecting certain ones of said plurality of DC voltage supply means into one of a plurality of possible circuit configurations, for applying a particular fixed level of DC output voltage therefrom across said armature winding, for operating said motor over a particular speed range;

adjustable DC current supply means responsive to a current magnitude signal, for selectively supplying a magnitude of current to said field winding directly proportional to the magnitude of said current magnitude signal necessary for obtaining and maintaining a desired speed within a particular speed range;

speed selection means for producing said current magnitude signal; and controller means responsive to the field current above base speed attaining a predetermined value, for continuously adjusting the amplitude of said current magnitude signal to change the magnitude of the field current towards a value for decreasing the magnitude of the armature current and while so operating, also being responsive to the first occurring one of the field current attaining a predetermined minimum magnitude concurrent with negative armature current, the field current attaining a first predetermined maximum magnitude concurrent with positive armature current, the armature current reducing to substantially zero, for then producing a first switching control signal for operating said switching means to disconnect said DC output voltage from across said armature winding, for next producing a second switching control signal for operating said switching means to first connect the plurality of DC voltage supply means into a different configuration producing a different level of DC output voltage, and thereafter a third switching control signal for operating said switching means to connect this new level of voltage across said armature winding, thereby changing the speed range with a substantially reduced magnitude of current being switched by said switching means.

2. The system of claim 1 wherein said controller means further includes logic means responsive to either one of two nonconcurrent conditions prior to changing the magnitude of the field current for decreasing the magnitude of the armature current toward zero: (1) the field current attaining a predetermined minimum magnitude concurrent with armature current below some predetermined maximum positive magnitude, for producing a switching control signal for increasing the level of DC output voltage, and (2) the field current attaining a predetermined second maximum magnitude concurrent with armature current above some predetermined maximum negative value, for producing a switching control signal for decreasing the level of DC output voltage.

3. In a speed control system for a DC motor having independent armature and field windings, and means for supplying current to these windings, a method for automatically switching the output voltage of a DC voltage supply applied across the armature winding from one fixed level to another concurrent with substantially reducing the armature current for changing the operating speed range of said motor from a first to a second range, comprising the steps of:

sensing the magnitude of current supplied to the field winding;

sensing the magnitude and direction of current supplied to the armature winding;

adjusting the current supplied to the field winding to a magnitude where the armature current is substantially forced toward zero value, in response to the magnitude of field current above base speed attaining a predetermined value;

disconnecting the armature voltage from across said armature winding in response to the first occurring one of the field current attaining a first predetermined minimum magnitude concurrent with negative armature current, the field current attaining a first predetermined maximum magnitude concurrent with positive armature current, the armature current reducing to substantially zero;

changing the level of said DC output voltage to a different level; and reapplying the DC output voltage across said armature winding.

4. The method of claim 3 further including before the step of reapplying the DC output voltage across said armature winding the steps of:

comparing the changed level of DC output voltage with the level of the voltage across said armature winding, for producing an error voltage equal to the difference therebetween; and changing the magnitude of the field current to reduce the level of the error voltage to substantially zero.

5. The method of claim 3, wherein said step of changing the level of said DC output voltage further includes the steps of increasing the level of said DC output voltage, if in the first speed range the field current attained a predetermined minimum magnitude concurrent with armature current below some predetermined maximum positive magnitude, and of decreasing the level of said DC output voltage, if in the first speed range the field current attained a predetermined maximum magnitude concurrent with armature current more positive than a predetermined negative value.

* * * * *